United States Patent
Michaels (10) Patent No.: US 10,439,706 B2
(45) Date of Patent: Oct. 8, 2019

(54) MOBILE SATELLITE COMMUNICATION SYSTEM

(71) Applicant: Paris Michaels, Sydney (AU)

(72) Inventor: Paris Michaels, Sydney (AU)

( * ) Notice: Subject to any disclaimer, the term of this patent is extended or adjusted under 35 U.S.C. 154(b) by 0 days.

(21) Appl. No.: 15/772,049

(22) PCT Filed: Oct. 31, 2016

(86) PCT No.: PCT/IB2016/056568
§ 371 (c)(1),
(2) Date: Apr. 28, 2018

(87) PCT Pub. No.: WO2017/072745
PCT Pub. Date: May 4, 2017

(65) Prior Publication Data
US 2018/0241464 A1    Aug. 23, 2018

(30) Foreign Application Priority Data
Oct. 30, 2015   (AU) ................................ 2015904471

(51) Int. Cl.
| | | |
|---|---|---|
| *H04B 7/185* | (2006.01) | |
| *H04B 7/06* | (2006.01) | |
| *H04B 7/204* | (2006.01) | |
| *H04B 7/195* | (2006.01) | |

(52) U.S. Cl.
CPC ....... *H04B 7/18513* (2013.01); *H04B 7/0617* (2013.01); *H04B 7/18521* (2013.01); *H04B 7/18539* (2013.01); *H04B 7/2041* (2013.01); *H04B 7/18565* (2013.01); *H04B 7/195* (2013.01)

(58) Field of Classification Search
USPC ......................................................... 455/427
See application file for complete search history.

(56) References Cited

U.S. PATENT DOCUMENTS

| | | | | |
|---|---|---|---|---|
| 6,016,124 A * | 1/2000 | Lo | ............................ | H01Q 3/26 342/373 |
| 6,233,456 B1 * | 5/2001 | Schiff | ................ | H04B 7/18541 455/436 |
| 6,246,874 B1 * | 6/2001 | Voce | .................. | H04B 7/18541 455/13.1 |
| 6,463,178 B1 * | 10/2002 | Kondo | ................. | H04N 19/587 348/458 |
| 10,142,011 B2 * | 11/2018 | Buer | ................... | H04B 7/18513 |
| 10,177,837 B2 * | 1/2019 | Ravishankar | ...... | H04B 7/18513 |

(Continued)

*Primary Examiner* — Julio R Perez (57) ABSTRACT

The present invention relates to a mobile satellite communication system that supports standard 2G, 3G, 4G and 5G mobile user equipment directly. The system comprising standard mobile user equipment, a low earth orbit satellite constellation, a satellite gateway connected to a terrestrial mobile network operator's operational support systems, a satellite beam steering controller configured to share mobile spectrum connected to an antenna array and digital beamformer that duplicates the mobile network's cell identification, frequencies, synchronization signals and control channels to satellite beams to form "Virtual Cells" further subdivided into "Doppler Cells" that are pre-compensated for the high range Doppler shift thereby reducing the residual Doppler shift received by the standard mobile user equipment to a range it can correct normally.

14 Claims, 7 Drawing Sheets

(56) References Cited

U.S. PATENT DOCUMENTS

2013/0210444 A1\* 8/2013 Morrin .................. H04W 48/06
 455/445
2015/0024677 A1\* 1/2015 Gopal .................. H04B 7/2041
 455/13.1

\* cited by examiner

MOBILE SATELLITE COMMUNICATION SYSTEM

TECHNICAL FIELD

The present invention relates to a mobile satellite communication system configured to operate with standard mobile user equipment.

BACKGROUND

Direct communications between the mobile terminals and satellites in mobile satellite communication systems has to date required bespoke, proprietary and mutually incompatible solutions that suffer from limited capability and utility, small subscriber populations, high cost and slow evolution compared to the mainstream terrestrial 2G, 3G and 4G mobile standards.

Basic 2G mobile cellular communication networks have achieved universal uptake but 4G coverage is patchy or non-existent in developing countries and many rural, regional and other under-served areas.

The present invention provides a universal solution to the technical and economic obstacles to complete mobile coverage and ubiquitous service and to the instant deployment of the latest mobile technology by working with existing mobile networks and extending geographic coverage to under-served areas while preserving investments in mobile user equipment, network infrastructure and spectrum licenses.

SUMMARY

Figure 1:
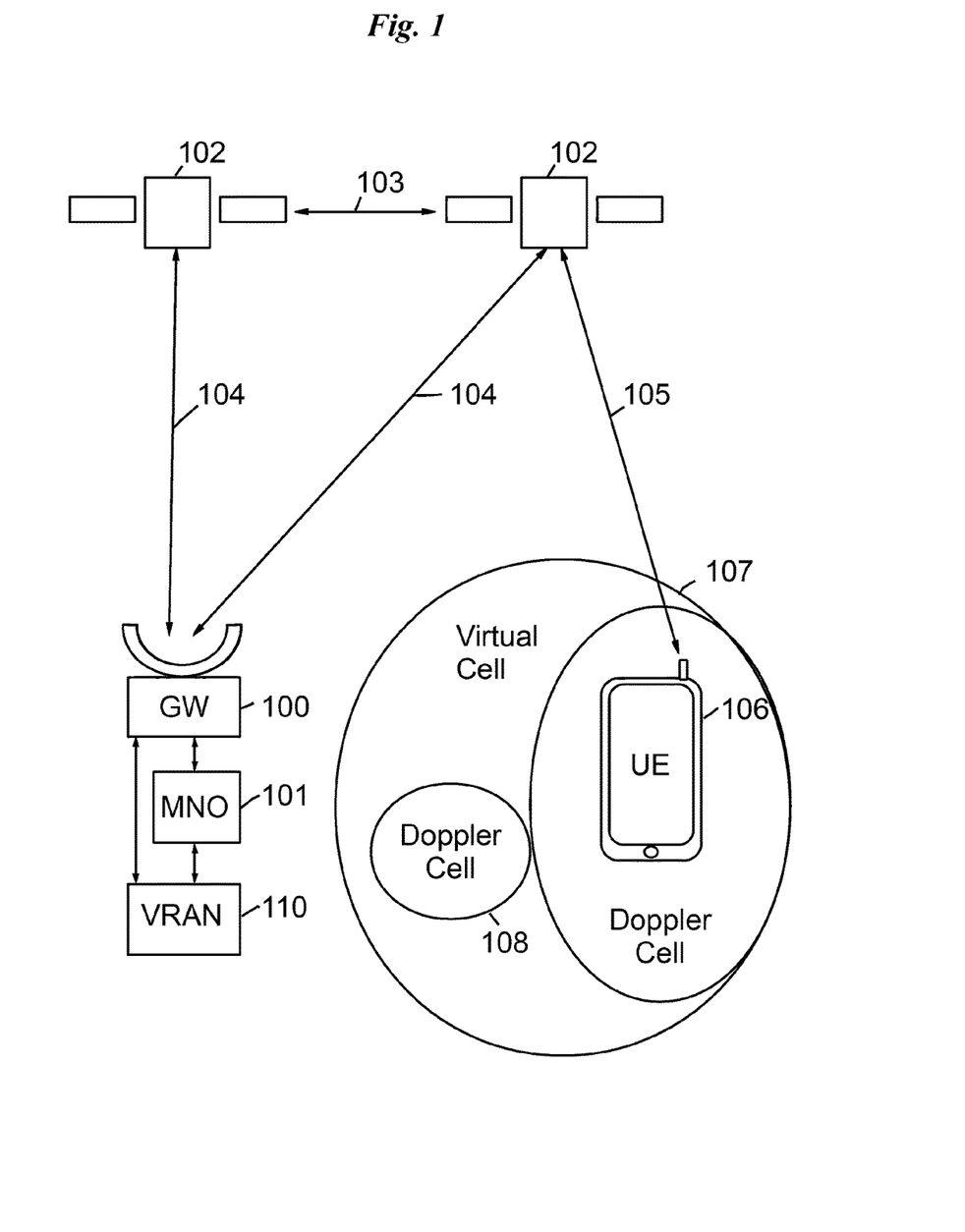
FIG. 1 Multi-standard mobile satellite communication system schematic diagram, one or more satellite system gateway 100 connected to one or more mobile network operators 101 via gateway 100 via satellite feeder up/down links 104 to satellite 102 constellation, inter-satellite communication and relay links 103, satellite spot beams 105 serving mobile standard compliant user equipment (UE) 106.

A global mobile satellite communication system comprising a constellation of low earth orbit (LEO) satellites (102), earth station gateways (GW) (100), virtual radio access network data centers (VRAN) (110), mobile cellular network operators (MNO) (101) and mobile or fixed user equipment (UE) or subscriber terminals (106).

The LEO satellites carry multiple radio transceivers and multiple antennas which support multiple and preferably all spectrum allocations in use by all participating MNO's in a coverage area simultaneously. Most market areas are served by one or more MNO's which may have one or more licensed spectrum allocations in use concurrently in the same or different geographic coverage areas.

The satellites can form multiple spot beams dynamically and concurrently at multiple operating frequencies communicate with one or more UE's using the same or different mobile network standards and mobile network operators.

Each mobile standard or system whether 2G, 3G, 4G, 5G and future standards yet to be defined will have different interfaces and protocols for physical access, logical access, authentication and resource allocation, scheduling methods and communication procedures and other numerous implementation details. Specific details given here as examples of such variations within and between standards and systems are not intended to limit the scope or spirit of the present invention. It is an object of the invention to encompass and support the rapid evolution and diversity of such implementation details transparently and virtually without limitation.

As the third generation partnership project (3GPP) Long Term Evolution (LTE) Release 8 (4G LTE) standard is the most advanced widely deployed mobile standard presently in use we shall use LTE terminology and naming conventions to identify the methods and procedures essential to all systems. It is another object of the present invention to accelerate the uptake of 4G LTE in countries and market areas which have lagged urban developed markets or are otherwise under-served.

DETAILED DESCRIPTION

A LEO satellite constellation and mobile satellite communication system with the capability to communicate directly with mobile cellular user equipment (UE) that is compliant with one or more 2G, 3G, 4G, 5G mobile standards and other mobile telecommunication standards is disclosed.

The LEO satellites in the constellation have the capability to form, scan, transmit and receive thousands of individual spot beams on the Earth's surface which are logically and functionally equivalent to the mobile coverage cells produced by conventional mobile cell towers. The diameter of such spot beams or virtual cells is proportional to the orbital altitude, operating frequency and antenna aperture dimensions.

By example and not to limit the invention, each satellite has multiple beams that may be scanned in latitude and longitude on the Earth's surface while concurrently operating in one or more of any of the standardized bands or spectrum allocations in use globally from 450 MHz to 3500 MHz. Similarly, each satellite can concurrently receive on multiple beams that are individually scanned and track and compensate the satellite motion in each virtual cell.

Apart from the physical transmit and active receive beams the satellite can digitally form numerous virtual scanning receive beams which can monitor millions of UE locations or virtual cells for active transmissions or network access requests. For example, in the 4G LTE Release 8 standard, a radio frame has a duration of 10 milliseconds (ms) and radio or air interface resources are scheduled and allocated in units of 1 ms sub-frames containing two 0.5 ms Resource Blocks (RB). In the frequency or Fourier domain a RB comprises 12 contiguous orthogonal 15 kHz subcarriers. In the time domain 12 (extended cyclic prefix (CP)) or 14 (standard CP) orthogonal frequency division multiplexed (OFDM) symbols in series form a sub-frame. A 20 MHz wide channel contains 100 RB's plus vacant guard bands. A satellite must therefore monitor and allocate 100000 resource blocks per second in the frequency-time grid per operational 20 MHz band in the mobile uplink and downlink. The one or more operational frequency bands will vary in each geographic area but are known in advance for each MNO.

Figure 2:
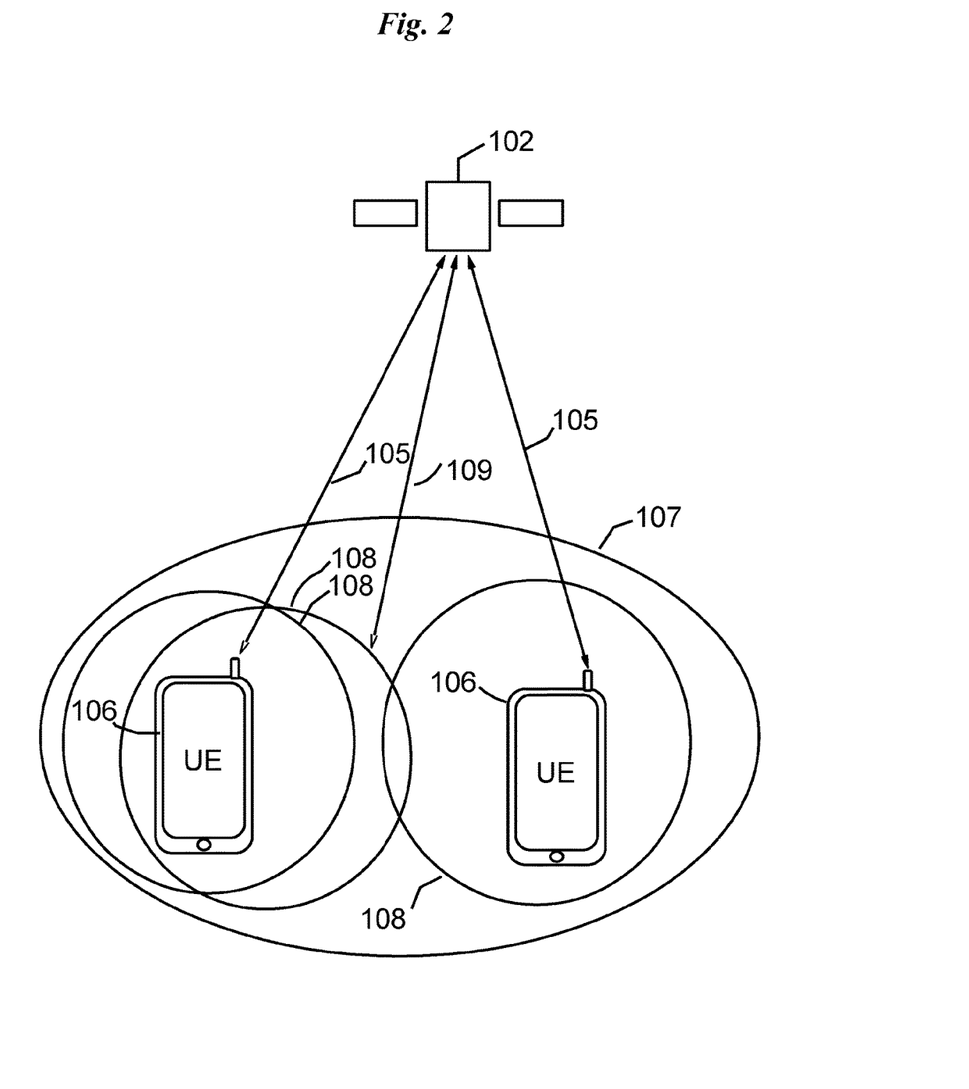
FIG. 2 Satellite 102 mobile downlink spot beams 105 with separately pre-compensated Doppler Cells 108 within Virtual Cell 107 serving subscriber terminal user equipment (UE) 106
Figure 7:
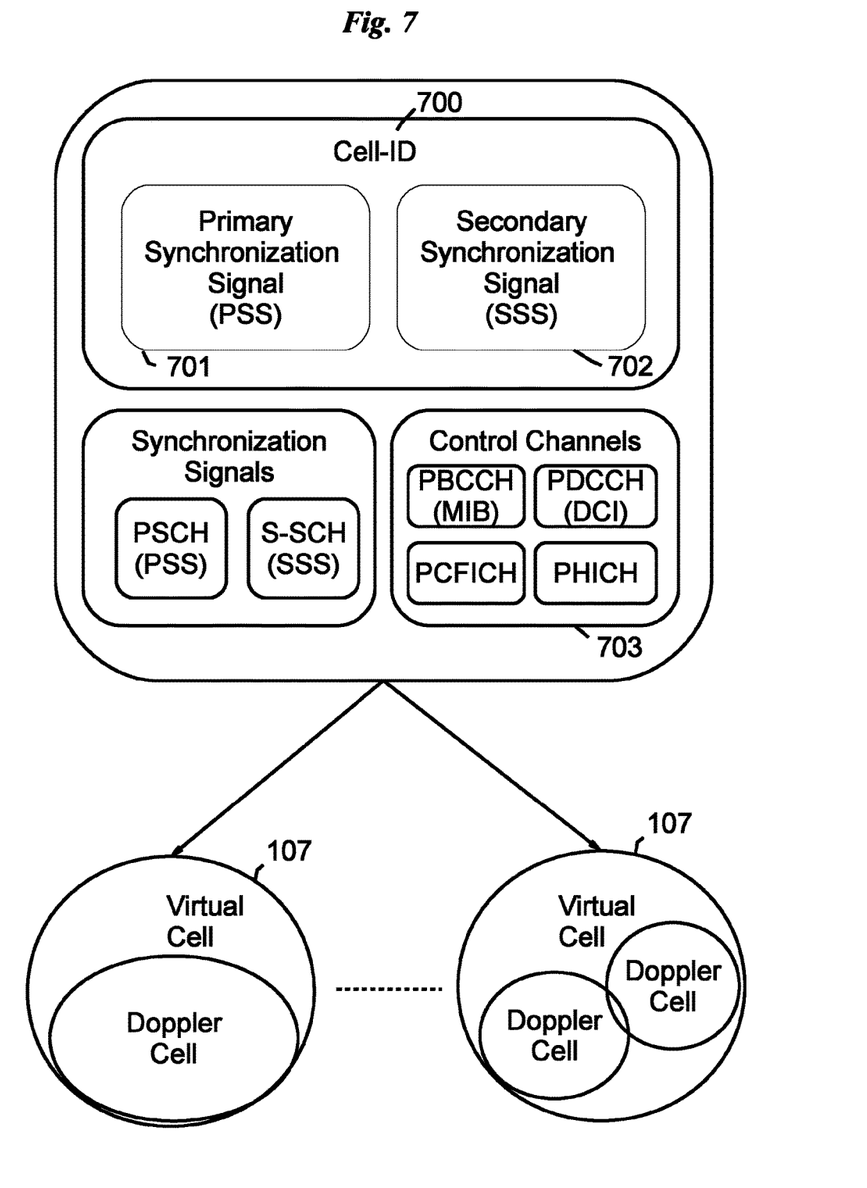
FIG. 7 Mobile downlink allocation of cell ID 700 and primary 701 and secondary synchronization signals 702 and their duplication into multiple Virtual Cells 107 in one or more spot beams.

A dynamic spot beam creates a Virtual Cell (107) of coverage on the Earth's surface. One or more virtual cells (107) are dynamically mapped to the RB's of a single parent logical cell (700) which is logically equivalent to a conventional physical cell sector. The control and synchronization channels and signals (701) (702) of the parent logical cell are duplicated to the child virtual cells and in turn map to physical transmissions using physical frequency resources allocated to the mobile uplinks and downlinks (105) (109). This has the effect of conserving finite resources in the mobile network system while multiplying the maximum number and total coverage area of the virtual cells and collectively the satellite network capacity. This is especially advantageous to the present invention when the spot beams are of small diameter and there are hundreds or thousands of spot beams in the coverage area of each satellite.

In the present invention a single mobile network cell-ID (700) can be mapped to multiple virtual cells (107) by duplicating the control and synchronization channels (701) (702) into the virtual cells. For example, in the prior art the 9-bit cell-ID defined by the LTE and other standards limited the number of cells to 504 in one radio network. The mapping of one cell-ID to multiple virtual cells directly multiplies the satellite system capacity and also supports seamless terrestrial cell coverage enhancement and coverage infill by extending a terrestrial mobile network via the space segment.

In the present invention, multiplexing of the two 1 ms subframes containing synchronization and control signals onto multiple virtual cells supports parallel synchronization in multiple spot beams per cell synchronization signal. For example, a single 20 MHz LTE channel will then support up to 94 active spot beams in a single instant by multiplexing the remaining RB's to Virtual Cells (107) and even smaller Doppler Cells (108). Multiplexing of available RB's in the time domain increases the active user capacity up to 94000 active UE's per second per channel. In the present invention the duplication of synchronization signals can support 94000 virtual cells per 20 MHz channel if each active UE is allocated one RB per second.

Another advantage of duplication of the cell synchronization signals from the logical or physical cells into the virtual cells is that handover of UE connections between spot beams and between virtual cells and terrestrial cells can be performed synchronously and transparently.

The cell synchronization signals are transmitted on 62 mid-band subcarriers (symmetric around the zero DC subcarrier at complex baseband) (six RB's, with 10 unused subcarriers) in each channel at 5 ms intervals. Since the satellite channel will add severe Doppler shift to the synchronization subcarriers they are pre-compensated for the predicted Doppler shift due to the relative radial velocity between the UE and satellite transmitter. The narrowband Doppler shift frequency offset $F_d$ is given by $$Fd = Fc(1 + v(\cos(\ominus))/c) - Fc \qquad \text{Equation (1)}$$

where $F_c$ is the originally transmitted carrier center frequency or a passband subcarrier center frequency in Hz, v is the radial relative velocity, c is the speed of light in vacuo and $\ominus$ is the angle of signal propagation between the transmitter and receiver.

Generally at the cellular bands of interest the pre-compensation is effective within a limited region inside a spot beam of less than 6.5 km diameter. Doppler shift pre-compensation is defined as effective when residual Doppler shift received by the UE is less than the correctable frequency offset allowed by the relevant standards' conformance test specifications. For example, the High speed Train (HST) propagation model is designed to test UE conformance and performance with a maximum correctable Doppler shift of 750 Hz. The effective Doppler shift pre-compensation spatial region defines a Doppler Cell (108) in the present invention.

In another aspect of the present invention the spectral band gap of 5 subcarriers before and after the synchronization signal RB's is used as additional protection against zero crossing Doppler shift incurred when the satellite passes directly above the UE and the relative radial velocity vector changes sign. In the present invention the various Doppler pre-compensation and management techniques implemented at the satellite transmitter support communication with unmodified mobile standards compliant UE subscriber terminals (106).

A spot beam may be much larger than the effective Doppler shift pre-compensation radius for fixed antenna dimensions particularly at lower operating frequencies. To address this problem differently pre-compensated synchronization signals adjusted for different sub-regions of a spot beam may be transmitted at different times to cover the entire spot beam area. Different pre-compensated synchronization signals adjusted for different sub-regions of a spot beam may be also transmitted simultaneously provided that the signals are orthogonal in the code domain. Naturally a spot beam coverage area may be shared between multiple bands (orthogonal in the frequency domain) and so different sub-regions within the spot beam coverage area may be served by different channels using optimally pre-compensated synchronization signals. The Doppler shift pre-compensation applied to synchronization signals can be further refined and optimized after the active UE positions and the instantaneous relative radial velocities are known precisely. The UE uplink random access preamble signals can be used to measure the UE specific Doppler shift. A median Doppler shift applicable to a downlink Doppler Cell (108) can be calculated with Eqn. 1 using a priori knowledge of the beam angle, downlink channel frequencies and optimized by the active UE measured Doppler shifts. Where one or more UE's have measured Doppler shifts indicating high velocity UE motion those UE's are allocated orthogonal RB's and grouped into one or more Doppler Cell's with effective pre-compensation of total high range Doppler shift from all sources.

Figure 5:
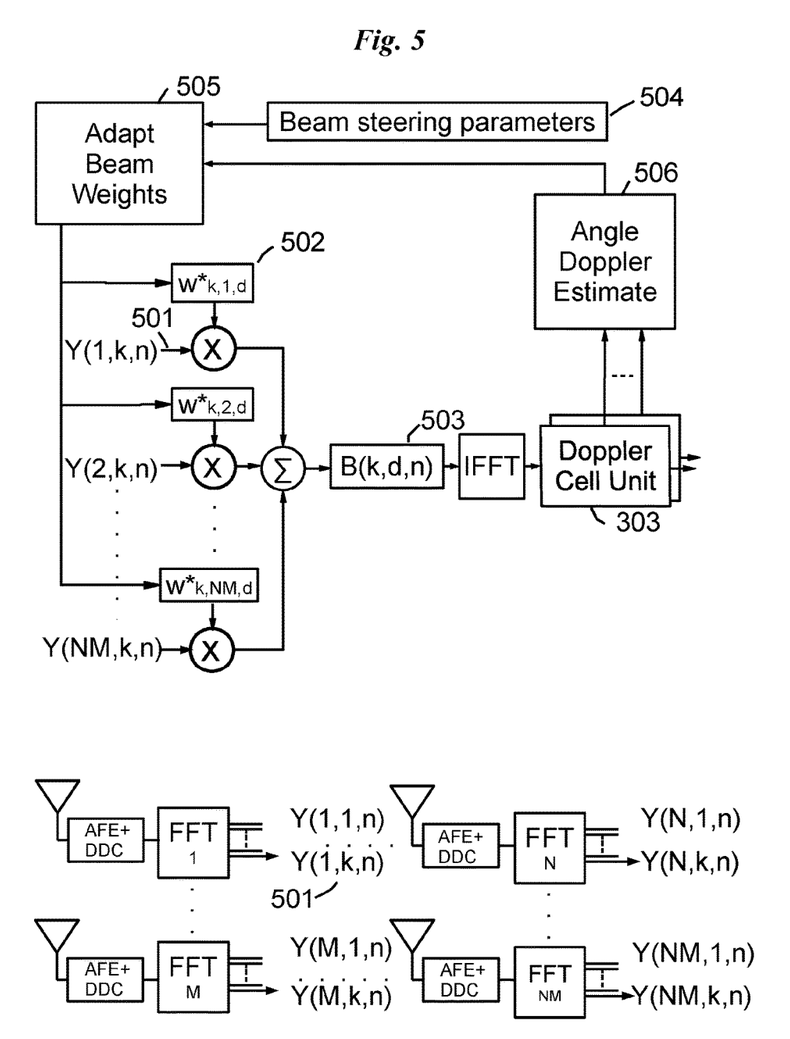
FIG. 5. Illustrates an adaptive frequency domain Virtual Cell digital beamformer (501, 502, 503) and satellite beam steering controller (504, 505) with angle Doppler estimate fine steering and authenticated beam steering parameters (504).

A receive beam (503) comprises a block of contiguous spectrum that includes the subcarriers of one or more contiguous RB's allocated to the mobile uplink and is steered to a specific direction or Virtual Cell. A beam steering vector is one of k×d sets of N×M complex exponential phase shifts (502) that are multiplied with the N×M selected $k^{th}$ subcarriers Y(NM, k, n) (501) in the discrete time frequency domain to give the k×$d^{th}$ output beam B(k, d, n) (503) where n is the discrete time $n^{th}$ sample. Multiple Virtual Cells with fine steering centered on d smaller Doppler Cells are adapted and formed from the same $k^{th}$ set of subcarriers (501) and similarly generated with reference to the measured angle Doppler estimate (506).

Initial access to the cellular mobile satellite system by a UE (106) begins with synchronization to the downlink radio frame and slot timing using synchronization signals (700) (701) (702) transmitted by the satellite (102). In LTE, the primary radio frame synchronization channels (P-SCH) and secondary symbol synchronization channels (S-SCH) each use six RB's dedicated to the transmission of primary (PSS) and secondary synchronization signals (SSS) every 5 ms. The PSS is one of a set of 3 length-62 Zadoff-Chu sequences (with one zero subcarrier at DC) known to the UE. At only one time instant will the UE cell searcher/synchronization signal correlator indicate that the cyclic shifted sequence is correctly synchronized with the PSS timing reference signal. The SSS is generated from a pair of known m-sequences offset according to the cell group id [0, . . . , 167] and sector id [0,1,2] that together form the logical and normally physical cell-ID. The synchronization signals (701) (702) also serve to identify a cell or a related set of Virtual Cell's (107) in this case. In the 4G LTE terminology a 9-bit cell ID (c-ID) (700) identifies the cell in a radio network and is encoded in the code sequences that form the synchronization signals. In earlier generation systems an absolute radio frequency channel number (ARFCN) along with a scrambling code also called a base color code (BCC) are used for cell identification and are likewise applied to support 2G and 3G mobile user equipment as required in the present invention.

The synchronized UE will now look at the first OFDM symbol (following the $zero^{th}$ reference symbol) of each subframe (this is the dedicated Physical Control Format Indicator Channel (PCFICH) (703)) which contains the length in symbols of the Physical Downlink Control Channel (PDCCH) (703). The control format data is shifted and scrambled by the cell-ID onto 4 non-adjacent sets of 4 subcarriers (32-bits total) to protect it against inter-cell interference using frequency diversity. The PDDCH symbols contain detailed Downlink Control Information (DCI).

The UE uses the reference signal in the first symbol of each subframe to correct the carrier frequency offset and perform channel estimation that improves the decoding performance of the Master Information Block (MIB) in subframe zero of System Frame Number zero (SFN0) which contains the downlink (DL) channel bandwidth and other system parameters.

The UE then decodes the Master Information Block (MIB) encoded in the physical broadcast control channel (PBCCH) (703) dedicated to the 72 central subcarriers (six RB's) in the $2^{nd}$, $3^{rd}$ and $4^{th}$ symbols that follow the P-SCH and S-SCH symbols in the first subframe (SFN0) of every 10 ms radio frame. Thus in the prior art there are 100 opportunities to synchronize and initialize the UE per second per physical cell sector per RACH. In the present invention the mapping of many virtual cells (107) to a single physical cell (C-ID) (700) directly multiplies the subscriber capacity of the satellite and also directly multiplies the initial access intensity capacity. It is also particularly advantageous to support the projected billions of additional machine-to-machine (M2M) and Internet of Things (IoT) terminals.

The UE then decodes the cyclic redundancy check (CRC) of the downlink control information (DCI) in the PDCCH (703) by using the system information radio network temporary identifier (SI-RNTI) as the 16-bit unmask value 'FFFF'h (all binary 1's and common to all initializing UE's). Since the PDCCH is QPSK modulated the length of this DCI is 144, 288, or 432 bits for L=1, 2, 3. The SI-RNTI masked DCI gives the RB location of the System Information Block type 1 (SIB1).

SIB1 is critical for decoding the other SIB's that are required for the next steps in the cell access procedures. SIB1 is transmitted on the first and fifth subframe and updated every 8 radio frames (80 ms). If a UE misses or fails to decode the SIB1 transmission it is delayed 20 ms before the next repetition of SIB1 i.e. waits 20 ms until it can complete the next step of the random access procedure. In practice the latency of random access to a cell is not entirely determined by the free space propagation delay but more so by the periodicity of physical layer procedures. In the present invention SIB1 is effectively replicated into the virtual cells at the same and different times which increases the UE random access capacity of the satellite network and reduces the effective physical layer random access latency.

SIB2 is downloaded from the Physical Downlink Shared Channel (PDSCH) assigned in the SIB1 scheduling information. SIB2 contains initial uplink transmission parameters.

One or more UE's will send a preamble on the Physical Random Access Channel (PRACH) after synchronization with the downlink radio frame. The PRACH procedures include contention resolution procedures if and when there is a collision between UE's transmitting identical preambles in the same time slot.

The preambles used to detect the initial UE access request vary in duration up to 2.2 ms (excluding guard time) and may be 1, 2 or 3 subframes long. Due to the duplication of cell-IDs into multiple Virtual Cells and the large coverage area of a satellite the number of random access slots is potentially considerably larger in the present invention than in a conventional terrestrial cell. Assuming 20% of the 94000 Virtual Cells per 20 MHz channel per second have scheduled uplink random access slots, the Virtual Cells are searched periodically for random access preambles at a frequency of 18.8 kHz.

Upon correct detection of a UE initial access preamble the virtual remote or on-board satellite enodeb processor replies with an acquisition detect message that contains a random access radio network temporary identifier (RA-RNTI) for the UE. The UE will use the RA-RNTI to identify itself and then requests the allocation of radio resources.

A UE will request uplink resources by transmitting a RRC connection request message in the Physical Uplink Control Channels (PUCCH).

In the present invention if the uplink channel processing capacity on-board the serving satellite is exceeded by the demand in its coverage area the digitally sampled and compressed mobile uplink data is forwarded to another satellite (102) with spare uplink processing capacity over the inter-satellite radio bearer (103) or forwarded to the gateway (100) for processing in a data center hosting one or more virtual radio access network (VRAN) (110) enodeb processing units which may be co-located within MNO (101) facilities.

A single 10 ms uplink radio frame from one antenna digitally IQ-sampled with 16-bit resolution at 30.72 MHz will generate 1.2288 Megabytes (MB) before any packet overhead or compression or 983.04 Megabits/s if sampled data is streamed continuously. In contrast the mobile downlink is efficient since the data is sent to the satellite in a compressed binary format by the standard methods over the X2 or S1 radio bearers and formatted for transmission on board the satellite. It is desirable to increase the number of concurrent cellular channels to maximize satellite network capacity but the sheer volume of sampled uplink data is a technical problem.

In the case of high random access intensity and processor overload, upon detecting a valid preamble the digital samples are multiplexed and streamed into the multi-gigabit downlink radio bearers (104) terminating at one or more ground station gateways (100). A particular gateway is selected based on the known geographic mapping of licensed bands to MNO's (101). The ground station gateway is connected to and ideally co-located with the serving MNO's operation support systems (OSS) or evolved packet core (EPC in 4G LTE terms) or can be remotely located within strict latency constraints for effective protocol compliance. If no suitable gateway is within direct range of the satellite the digitized radio frame is routed and streamed to the inter-satellite links (103) and relayed until it reaches a suitable destination gateway for processing.

Only the non-redundant elements of the cellular uplink are sent from the satellite network to the VRAN and the cellular downlink radio frames are reconstructed in real time on board the satellite. An analysis of the structure of the cellular uplink shows that even under the assumption of a modest lossless compression ratio of 4, that the downlink bit rate to the VRAN can be reduced to about 20% of the bit rate required for trivial streaming of the raw sampled data. The reference signals and cyclic prefixes in each mobile uplink radio frame are stripped before compression and can be identified with modest on-board processing. In the present invention the most computationally expensive task of iterative decoding of hundreds of receive channels is addressed by distributed processing if the on-board capacity of a single satellite is exceeded.

It is advantageous to employ lossless data compression with modest compression ratios in the range of 2 to 4 that provide perfect signal reconstruction. Lossy compression schemes such as mulaw compression will be known to those skilled in the art but will degrade the error vector magnitude (EVM) performance of the physical layer decoding and may only be used advantageously in the high SNR regime. Each digitized, packetized, compressed, serialized radio frame will include a time stamp and unique nonce for reliable de-serialization at the remote processor.

After standards compliant higher layer processing at the gateway, a subscriber authentication and network attachment procedure is completed according to the standard relevant to that mobile UE. Initially a UE will attach to the network with a cell radio network temporary ID (C-RNTI) until the SIM and/or IEMI is properly authenticated or rejected. These standardized authentication and network attachment procedures may take many milliseconds to complete.

Timing synchronization is critical in the LEO satellite channel particularly and in high throughput mobile networks generally. Timing slot synchronization is determined by the distance between each UE and satellite pairing. A single timing advance unit (Ta) is defined as 16 samples ($16T_s$) or 0.52 microseconds. In the prior art the maximum cell radius supported by LTE is normally limited by the timing advance parameters used to synchronize time slots between the UE's and enodeB. The 11-bit timing advance parameter ($N_{ta}$) has a maximum value of 1282×0.52 microseconds setting a maximum 200 km cell radius in frequency division duplex (FDD) 4G LTE networks.

Referring now to a time division duplex (TDD) 4G LTE network the timing advance offset parameter is summed into the timing slot synchronization calculation as $N_{ta}+N_{taoffset}$. In the present invention to support TDD the timing offset parameter $N_{taoffset}$ is set to a value consistent with the satellite to UE path propagation delay. For example $N_{taoffset}$ value 3846 is consistent with an orbital altitude of 600 km with the UE located at the sub-orbital point at sea level.

Timing synchronization accuracy to within a single unit time step remains valid longer than the minimum timing advance update interval of 500 ms expected by the UE. At an orbital velocity of 7558 m/s this will allow transmission of multiple 10 ms radio frames between scheduled updates to UE's within a Doppler Cell. Timing advance commands are broadcast across virtual cells synchronously and the updates are relative to the current timing advance value. Whenever a UE receives a timing advance command from the enodeb it calculates the new timing advance $N_{TA\_new}$ given by $$N_{TA\_new}=N_{TA\_old}+(T_A-31)\times 16 \qquad \text{Equation (2)}$$

Timing advance and timing alignment is a technical problem for mobile satellite communication systems that aim to support mobile standards compliant UE's that is addressed in the present invention. Further the UE expects to receive timing advance commands from the enodeB no more frequently than at 500 ms intervals. In the present invention the sub-division of Virtual cells into Doppler cells ensures that the maximum timing advance Ta=[0, . . . , 63] allowed in one timing advance message is never exceeded. The maximum path length difference between a UE at the center relative to a UE at the edge of Doppler cell is always less than 63 Ta units. The satellite beam steering controller periodically updates the resource scheduler and higher layers since the timing advance message must be issued to the UE's to compensate the satellite position.

The UE LTE protocol stack software may internally encode the $N_{ta}$ variable as a 16-bit unsigned integer which yields a maximum value of 34.1 ms. The LTE standard for FDD systems defines a maximum accumulated timing advance parameter equal to 1282 Ta units or 667 microseconds which is met by the present invention. Likewise 3G standards limit the maximum timing advance to a delay much less than the satellite channel propagation delay.

Random access uplink collisions and contention are expected to occur occasionally and the LTE standard contains a random access contention resolution procedure. In the present invention the increased frequency of random access collisions in the long satellite channel can be predicted in the case of many UE's in a virtual cell and the collision probability P can be expressed as $$P=1-e^{-\gamma/L} \qquad \text{Equation (3)}$$

where L is the total number of random access opportunities per second and γ is the random access intensity, i.e. there are on average γ random-access attempts per second in the virtual cell. In the present invention L is increased by scheduling more uplink RB's to random access channels when high levels of contention are predicted or detected.

Absolute carrier frequency generation on board the satellite is synchronized and phase locked to an oven controlled system reference clock oscillator which in turn is conditioned to an external network wide reference such as the one pulse per second (1 PPS) Global Positioning System (GPS) timing reference signal or backup reference clock hosted with the gateway.

The uplink from the UE to the satellite is not pre-compensated for the expected Doppler shift by unmodified 4G standard compliant mobiles and so the satellite receiver will detect severe inter symbol interference (ISI) and inter carrier interference (ICI). The satellite receiver will apply signal processing to each uplink symbol and every subcarrier to remove the Doppler shift and cancel the interference before decoding. The carrier frequency offset of each UE transmission is tracked and corrected for every symbol and every subcarrier. The instantaneous relative propagation angle, radial velocity and frequency determine the Doppler frequency shift individually for each UE, symbol and subcarrier.

Per subcarrier frequency correction is required for optimal satellite receiver performance in the uplink for every UE and every RB. Sub-optimal signal processing that leaves an uncorrected residual Doppler shift can seriously degrade bit error rate performance of OFDM receivers. Large Doppler shifts between adjacent RB's can cause same user inter-subcarrier interference and interference to other user transmissions and require transmitter pre-compensation, receiver interference cancellation signal processing or interference prevention and avoidance by orthogonal scheduling.

Figure 3:
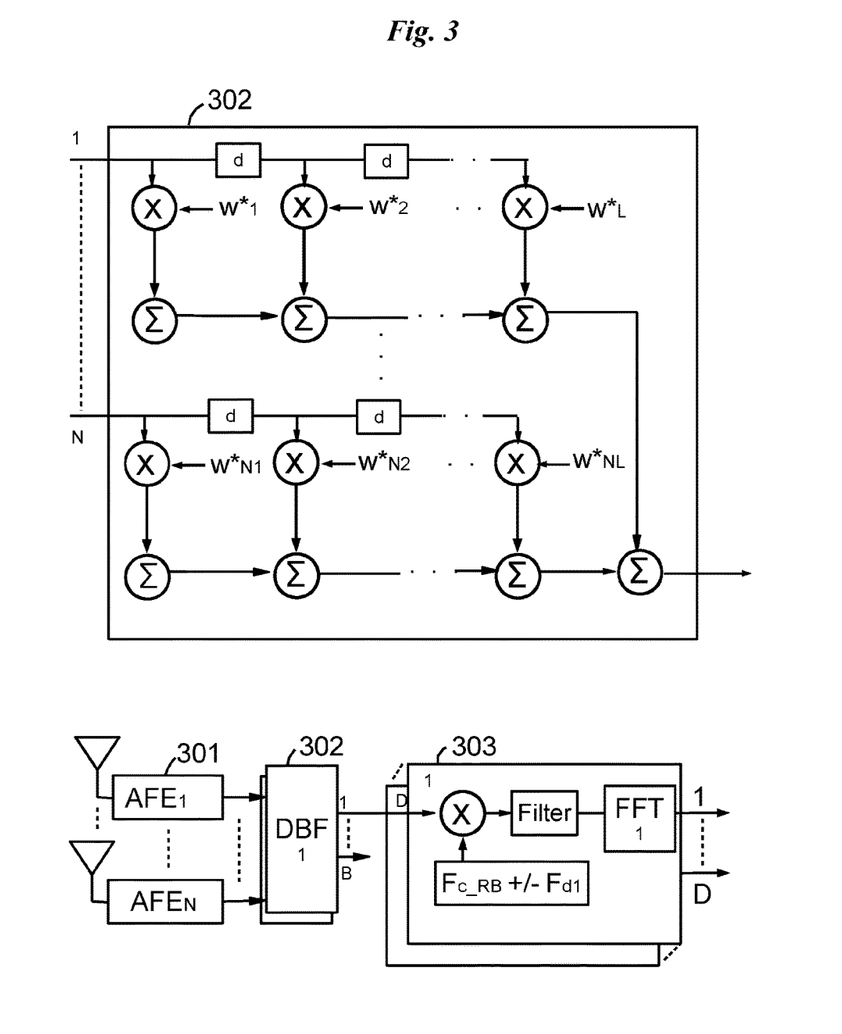
FIG. 3 A multi-dimensional time domain beamformer 302 with radio frequency analog front end 301 multiple output beams B and multiple Doppler Cell units 303 and internal details of one of the space-time beamforming digital signal processing units 302.

Under conditions of light load in the mobile uplink, the simplest approach that prevents interference between adjacent RB's is to prevent the uplink resource scheduler from allocating adjacent RB's in the frequency domain in concurrent time slots in the same receive spot beam. An RB that could be corrupted by uncorrected Doppler shift interference is defined as an adjacent RB. At 2700 MHz up to six 15 kHz subcarriers are affected before or after an allocated RB, depending on whether the Doppler shift is negative or positive, so one RB would be left unallocated for each contiguous RB block. If the satellite will pass over the UE at zenith then two RB's, one at either side of the RB block are left unused. The empty RB's can be used in different non-adjacent spot beams due to the mapping of multiple virtual cells to a logical cell's resources and so the system capacity is preserved. The Doppler Cell unit (303) easily corrects the frequency offset of the Doppler shifted subcarriers since the gaps between the active spectrum prevent inter-carrier interference at the relevant velocity and operating bands.

The residual or uncorrected Doppler shift frequency offset affects the choice of preamble. The choice of du parameter used to calculate the cyclic shift of the ideally orthogonal Zadoff-Chu preamble sequences used by restricted sets in the UE uplink random access preamble affects the preamble detector performance in high speed channels. Preamble format 3 with a preamble sequence duration ($T_{seq}$) of 1.6 ms (excluding guard time and cyclic prefix) assumes a maximum Doppler shift of 625 Hz. Since high Doppler shift is not pre-compensated in unmodified UE transmitters the preambles will not be orthogonal in the code domain and normal preamble detection fails at the satellite receiver and this technical problem must be addressed by the present invention. A simple solution would enforce contention free random access procedures in all random access slots. This would limit the random access capacity to one UE per random access slot and is at best suited only to extremely low population density coverage areas in the low random access intensity, low collision probability case.

In the present invention preamble detection follows receive beamforming and so the preambles are already sorted into spatial bins and the major component of the uncorrected Doppler shift is also known a priori. At the relevant frequencies and velocities the high angle dependence of the Doppler shift provides angular resolution of much less than one degree and a UE (106) can be localized within a 6.5 km diameter Doppler Cell (108). This is sufficient resolution for accurate timing alignment and synchronization between the UE's and satellites (102).

In the present invention the receive beams in the spatial domain are further subdivided into Doppler Cells (108) which have an expected Doppler shift that can be corrected at the satellite receiver. Doppler shift is exploited as a useful separable dimension not merely an impairment that must be corrected justifying the term "Doppler Cell". The present invention can separate signals from closely spaced UE's with resolution much smaller than the antenna main lobe beamwidth at all but the highest operating frequencies of interest where the beamwidth is comparable to the dimensions of the Doppler Cell.

The frequency offset corrected Doppler Cells are then searched for preambles separately and in parallel.

The residual Doppler shift due to UE motion or offset compensation error affects the orthogonality of concurrent preambles and leads to false correlation peaks but is now less than 750 Hz after the Doppler Cell unit (303). The restricted set preamble sequences with prescribed zero correlation zones (ZCZ) for high-speed cells exclude the false correlation peaks from the cyclic shift detection window and further aid the objectives of the present invention.

The expected or a priori known Doppler shift $Fd_d$ is calculated for the $d^{th}$ Doppler cell and applied to correct the frequency offset of the RACH including an additional frequency offset equal to the RACH center frequency $F_{c\_RB}$ The FFT within the Doppler Cell unit (303) can have a variable point size depending on the type of channel allocated to that RB or block of RB's. For a random access uplink channel a 839-point FFT is computed with a 1.25 kHz subcarrier spacing. Note that the RACH Doppler Cell units can be placed in a separate faster clock domain than the data channel Doppler Cell units if oversampling is desired for finer time resolution or processing gain.

The frequency domain preamble correlator is a very efficient application of the correlation theorem. The frequency domain complex conjugate of the known candidate preamble root sequence F(preamble$_{u,cs}$)* is element wise multiplied with the frequency domain output D(k, d, n) of the Doppler Cell unit (303) assigned to a RACH to give the Fourier transform of their cross correlation. We then transform back to the time domain using IFFT and after squaring (Eq. 5) detect the correlation peak(s) at the delay(s) corresponding to the cyclic shift(s). Note that there may be multiple RACH duplicated across several Virtual Cells to multiply the satellite random access capacity.

$$|F^{-1}(D(k,d,n) \times F(\text{preamble}_{u,cs})^*)|^2 \qquad \text{Equation (4)}$$

Since the PRACH preambles use narrower subcarriers (1.25 kHz wide) than normal, the 12 or 13 null subcarriers in the preamble guard bands either side (15 or 16.25 kHz) alone will not protect the preamble from the severe Doppler shift in the mobile satellite channel. The satellite receiver will detect inter-carrier interference with active adjacent uplink subcarriers either side of the preamble and apply interference mitigation and cancellation techniques.

In the present invention the uplink scheduler can simply leave a RB either side of the six RB's allocated to each PRACH (signalled to the UE's in SIB2) unused to prevent inter-carrier interference due to Doppler shift in the satellite channel. The RB's unused in one virtual cell may be used in another non-interfering virtual cell within the same cell-ID group without impact on higher layer processing or wasting spectrum.

The RACH preamble response window is 12 ms maximum. This limits the allowed propagation delay determined by the maximum satellite altitude and the minimum elevation angle (relative to the horizon) less the response processing delay. Preamble format 3 requires 3 ms to complete transmission. Assuming a zero delay reply is sent instantly at the end of the preamble observation window the maximum one way free space path length from UE to satellite is less than 1800 km. Allowing for the round trip response time from the VRAN or gateway further reduces the maximum one way path length to 900 km. In the present invention large satellite constellations in low earth orbits and high elevation angles are designed to support fast random access within the mobile standard defined timing constraints.

The required RACH preamble missed detection ($10^{-2}$) and false alarm probability ($10^{-3}$) is determined by the minimum received power of the preamble $P_{RA}$ (18 dB in terms of total preamble energy to noise spectral density ratio $E_p/N_o$) which in turn determines the minimum preamble sequence duration and preamble format. In the present invention this determines a minimum satellite antenna gain $G_{rx\_sat}$ to achieve the required $E_p/N_o$ where $P_{rx\_sat}$ is the received power given by $$P_{rx\_sat} = P_{tx\_ue} + G_{tx\_ue} + G_{rx\_sat} - L_{satellite\ channel} \quad \text{Equation (5)}$$

noting that $L_{satellite\ channel}$ is the free space path loss in the satellite channel and NF is the satellite receiver noise figure the preamble sequence duration $T_p$ in seconds is given by $$T_p = \frac{N_0 \cdot NF \cdot (E_p/N_0)_{req}}{P_{rx}} \quad \text{Equation (6)}$$

The preamble cyclic prefix duration is designed to prevent inter-symbol interference (ISI) and should exceed the maximum multipath time delay spread of the channel and ranges from 15 us (microseconds) to 684 us. In the present invention the satellite constellation is designed to ensure that the minimum elevation angle from the horizon limits the excess delay contribution from all sources in the satellite channel. According to recommendations in ITU-R P.618-12 and ITU-R P.531 the sum of the various excess delays from all sources at cellular operating bands is less than the cyclic prefix duration. At 30 degrees elevation angle ionospheric effects contribute less than 5 microsecond delay above 500 MHz under worst case total electron content ($TEC/m^2$). By measurement and simulation it is predicted that the maximum delay spread of the satellite channel at 70 degrees elevation angle with the mobile receiver in a suburban environment is 350 ns at −30 dBc (relative to the principal path).

The detection of random access preambles in the presence of severe ionospheric scintillation can be a technical problem since the peak to peak fading can exceed 20 dB at 1 GHz over time scale of 100 ms to 1 second. The amplitude of the preamble subcarriers does not encode any information from the CAZAC sequence and offers some immunity and the fading can be measured directly. Impaired Physical Random access channels (RACH) can be moved in the frequency-time grid or to different beams or adjacent satellites in the constellation which have a different ionospheric slant path to the coverage area.

The maximum preamble guard time using a standard preamble format is 0.716 ms (using preamble format 3) which is longer than the round trip time in a cell of maximum radius less than 107 km. Recalling that uplink timing synchronization in the RACH is imperfect, in the present invention interference between adjacent time slots is prevented by the uplink scheduler which allocates the interference prone subframes in the frequency-time grid only in spatially orthogonal virtual cells in the same band.

In another aspect of the present invention when a random access collision or interference between adjacent slots is detected the space-time processor adapts the beam space to spatially separate the interferers or colliding UE's retrospectively on the stored samples.

In the very high UE load scenario when UE's are not separable in the space-time domain, interference from a RACH transmission to adjacent data RB's in the frequency domain is limited since the known preamble sequences can be subtracted from the Doppler corrected adjacent data subcarriers by successive interference cancellation. Conversely interference from a data RB to a RACH is limited to much less than the empty 15 kHz preamble guard bands since the RACH and data RB high range Doppler shifts are corrected before preamble detection and data RB uplink timing is already synchronized.

Apart from identifying a random access request the preamble is used to determine the initial UE uplink timing and UE specific Doppler shift and Doppler cell angular direction fine estimate. Note that the uplink timing advance information normally derived from the preamble arrival timing normally indicates the absolute propagation delay from UE to the enodeb up to the cell radius. In the present invention the path delay difference between UE's within a Virtual Cell is the relevant parameter encoded by the preamble time delay. The preambles' Doppler shift provides an angle estimate and absolute propagation path length estimate with accuracy up to the unknown UE motion. Similarly the standard cyclically shifted preamble sequences are still usefully orthogonal since the satellite to UE path length difference between UE's within a Virtual Cell is similar to a cell with radius in the range 3 to 21 km. A longer cyclic shift is preferred provided that the reduced number of shifted preamble sequences can support the UE random access intensity in the Virtual Cell. Collision detection and contention resolution are standard features in UE implementations.

The frame and symbol timing a particular UE will derive from synchronization with the downlink pre-compensated PSS and SSS signals is a function of its relative location and provides localization information to within 156 m if the preamble cyclic shifts are correctly decoded.

The broadband beamformer updates (505) integrate angle information derived from Doppler estimation and compensation into the beam steering vector improving spatial accuracy and resolution substantially since the satellite position, radial velocity and frequency references are known to great precision.

The UE frequency error by standard conformance is less than +/−0.1 ppm observed over one time slot (0.5 ms) relative to the enodeb carrier frequency. At the carrier frequencies of interest this frequency error may be of similar magnitude to the residual satellite Doppler shift frequency. It is advantageous to accurately measure the UE frequency error in order to improve the pre-compensation accuracy relative to each UE. In the present invention the high frequency feeder up/down links (104) to the fixed location gateways (100) are precisely calibrated to a higher precision frequency reference. The feeder uplink frequency can be used for high precision ranging and instantaneous satellite velocity measurements that can be used to determine the frequency compensation to be applied to the mobile downlinks and to estimate the unknown residual frequency error of the UE. After frequency correction and Doppler pre-compensation in the downlink any remaining residual frequency offsets are within the standard compliant frequency correction capabilities at the UE.

Cross polarization is a potentially severe satellite radio link impairment that can be worse than −35 dB at frequencies below 10 GHz. While there are known techniques to correct de-polarization such as cross polarization transducers at the satellite receiver side of the link, the cross polarization at the mobile receiver can cause fading and poor signal quality in single antenna UE implementations. In the present invention the dual polarization and adaptive control of the power in each polarization can be controlled for each beam at the satellite transmitter. A UE (106) will typically have multiple antenna ports and one or more dual polarized antennas to support antenna diversity and MIMO modes which can be used to mitigate the signal fading due to cross polarization.

In a further aspect of the invention the direct communication between LTE 3GPP release 13 compliant UE's (106) is extended to the wide area via satellite (102) and is supported as illustrated schematically in FIG. 2.

In another useful aspect of the invention a UE (106) that supports carrier aggregation (LTE-Advanced 3GPP release 13 compliant UE's) may connect with multiple overlapping Doppler Cells 108 and Virtual Cells 107 at different carrier frequencies 105 and 109 or frequency bands which map to the component carriers and is illustrated schematically in FIG. 2.

Interworking with the terrestrial mobile cellular networks of one or more MNO's is a key objective of the present invention. A MNO (101) can allocate one or more Cell-ID's to the space segment that are adopted by one or more satellites (102) as they enter into service range. The satellites adopt the Public Land Mobile Network (PLMN) identity code assigned to the MNO and this supports the seamless authenticated roaming of the UE (106) between the terrestrial cells and the satellite systems' virtual cells (107) with synchronous handover in adjacent or overlapping coverage areas. In overlapping coverage areas the mobile satellite system can provide an improved "infill" coverage service where terrestrial cells otherwise yield poor or patchy local coverage as well as extending coverage across an entire country.

Figure 4:
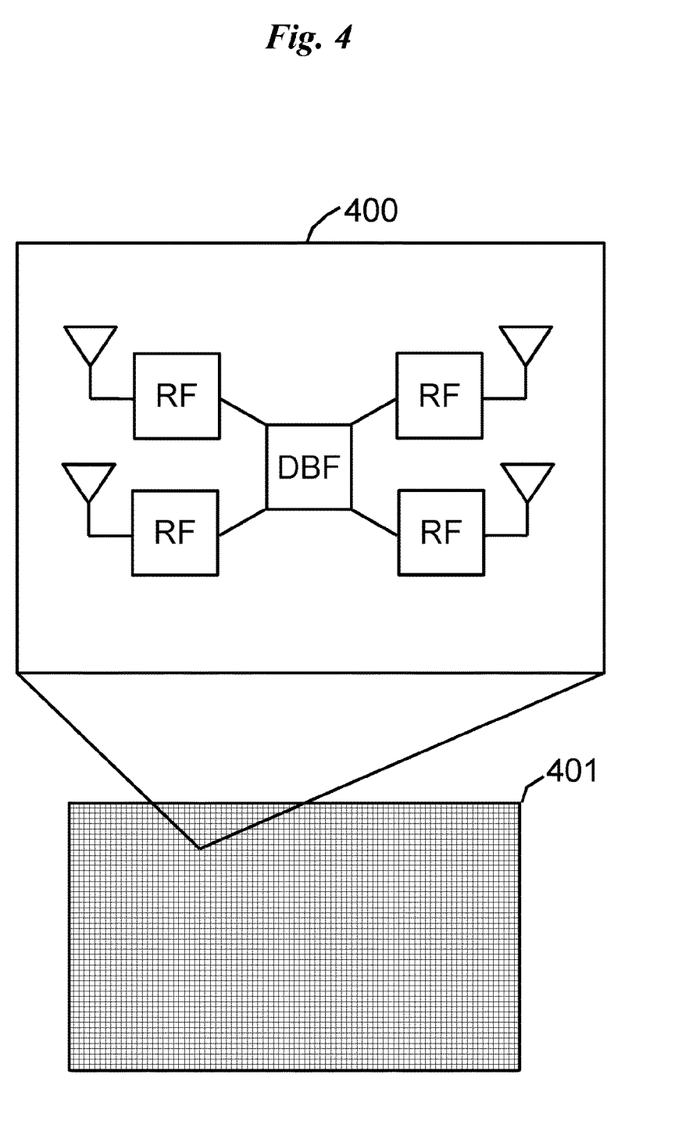
FIG. 4 Illustrates a digital beamforming array element 400 with radio frequency analog front ends connected to each of the plurality of antenna elements in the 2-dimensional antenna array 401.

The digital beamformers illustrated in FIG. 3, FIG. 4 and FIG. 5 sample a 2-D hexagonal array (401) of NM active antenna elements (400). Hexagonal sampling is 13.4% more efficient than rectangular sampling in this application. FIG. 5 is the frequency domain dual of the time domain beamformer of FIG. 3 and illustrates one of the functionally equivalent variations that are all within the scope of practice of the invention.

The radio frequency (RF) and analog front end (AFE) 301 performs bandpass filtering and analog to digital conversion and complex digital down-conversion (DDC) to a digital intermediate frequency (IF) which is followed by a digital beamformer 302 which forms and outputs multiple beams or Virtual Cells 107 steered to a range of directions in azimuth and elevation then followed by a Doppler shift correction block 303 which applies a known median Doppler Frequency $F_d$ calculated from frequency $F_c$ by equation 1 and filtered then converted from the time domain to the frequency domain by Discrete Fourier Transform (DFT) or Fast Fourier transform (FFT) on the selected subcarriers corresponding to a contiguous block of one or more RB's in one of the D frequency offset corrected Doppler Cells 108. Note that the signal processing paths and outputs are complex with real and imaginary parts although shown as a single lines for simplified illustration and that the structure is reciprocal for the purpose of transmit and receive by inverting the direction of the signal paths.

Quantization of the beamformer steering vector follows from the discrete time domain digital implementation and the finite number of array elements. In practice a spot beam or Virtual Cell may be much larger than the ideal Doppler Cell radius and a means to improve the resolution of the steering vector is desirable. The Virtual Cell radius is a function of range, propagation angle, frequency and antenna system gain. In the present invention improved discrete time delay resolution by increasing the pre-beamforming sample rate by an integer multiple provides a direct solution. For example if 10 Doppler Cells are needed within a Virtual Cell the sampling rate is increased and the sampling period is $T_s/10$. However, practical implementations have upper limits on sampling clock rates.

In another variation interpolation is used after digital sampling to achieve higher time delay resolution. Interpolation factors, I, may range between 2 and 64 and may vary from beam to beam. Interpolation after a broadband to narrowband transformation block such as a filter bank is more efficient since the output samples can be interpolated at a relatively slow sampling period of $KT_s/I$ rather than $T_s/I$ where K is the number of frequency bins.

Alternatively, the frequency domain beamformer is a preferred embodiment and reduces overall implementation complexity for OFDM signals such as LTE. A time delay is equivalent to multiplication by a complex phase $e^{-j\theta}$ in the frequency domain with the advantage that the delays are not integers. Beam steering vectors are updated on every symbol to compensate satellite motion and reduce pointing error.

The frequency domain beamformer's computational complexity is minimized when the beamforming resolution in the frequency domain is reduced to one or more RB's (>180 kHz) and this is sufficient to steer the beams and correct the a priori known coarse Doppler shift. The complexity is reduced to NM×f-FFT where f=64 rather than f=2048. Larger bandwidths are also required in beams where random access channels (UL) or synchronization signals (DL) are allocated and may be formed by collecting the output from contiguous frequency bins then steering them to the same direction.

Overlapping beams on the coarse frequency domain beamformer frequency grid are created across resource block boundaries by combining contiguous subcarriers to ensure that Doppler shift and inter-carrier interference can be estimated, corrected and cancelled.

After beamforming the beams can be converted back to the discrete time domain for fine Doppler shift estimation and correction and then converted back to the frequency domain with the corrected subcarrier alignment and expected symbol subcarrier spacing $F_{sc}$ (where $F_{sc}$={1.25 kHz, 7.5 kHz, 15 kHz} in LTE preamble, extended or standard OFDM symbols respectively).

Apart from frequency offset correction the fine Doppler estimate provides an angle of arrival used to adapt and fine steer the main beam lobe which may improve SNR by up to 3 dB. The measured Doppler frequency provides a refined estimate of the a priori angular direction of a UE. In the frequency domain the beamforming weights can be updated and adapted up to machine precision for each active Doppler Cell. A wide variety of adaptation and beamforming algorithms are known in the prior art that may be applied to these particular aspects of the present invention and yet remain within the spirit and scope of the present invention.

In the present invention licensed spectrum access is authorized by a MNO (101) by issuing an encrypted digitally signed spectrum access certificate (600) to the mobile satellite communication system operator which unlocks the operating frequencies licensed for use in a prescribed coverage area to that MNO. The satellite (102) cannot activate its transceivers in the licensed mobile bands in a mobile service area without the valid time stamped MNO spectrum activation certificate (600). In turn the certificate may be revoked or reissued by the relevant spectrum regulation authority in a jurisdiction from time to time. The certificates are digitally signed and encrypted in turn by the relevant regulatory authorities using a private key known only to the regulator then by the MNO with its private key. Finally the satellite operator signs multiple copies of the already two-way signed spectrum access certificate (600) using a private key ring where each private key in the ring represents a set of beam (503) shaping and steering parameters (504) that map or allocate Virtual cells to a specified authorized geographic coverage region. Additional parameters necessary for other signaling procedures such as handover or new procedures for 5G yet to be defined can be readily added to the access certificate (600) before one or more of the encryption stages using standard methods and protocols such as eXtensible Markup Language (XML) and Abstract Syntax Notation (ASN.1) and are denoted as "etc." in FIG. 6.

Figure 6:
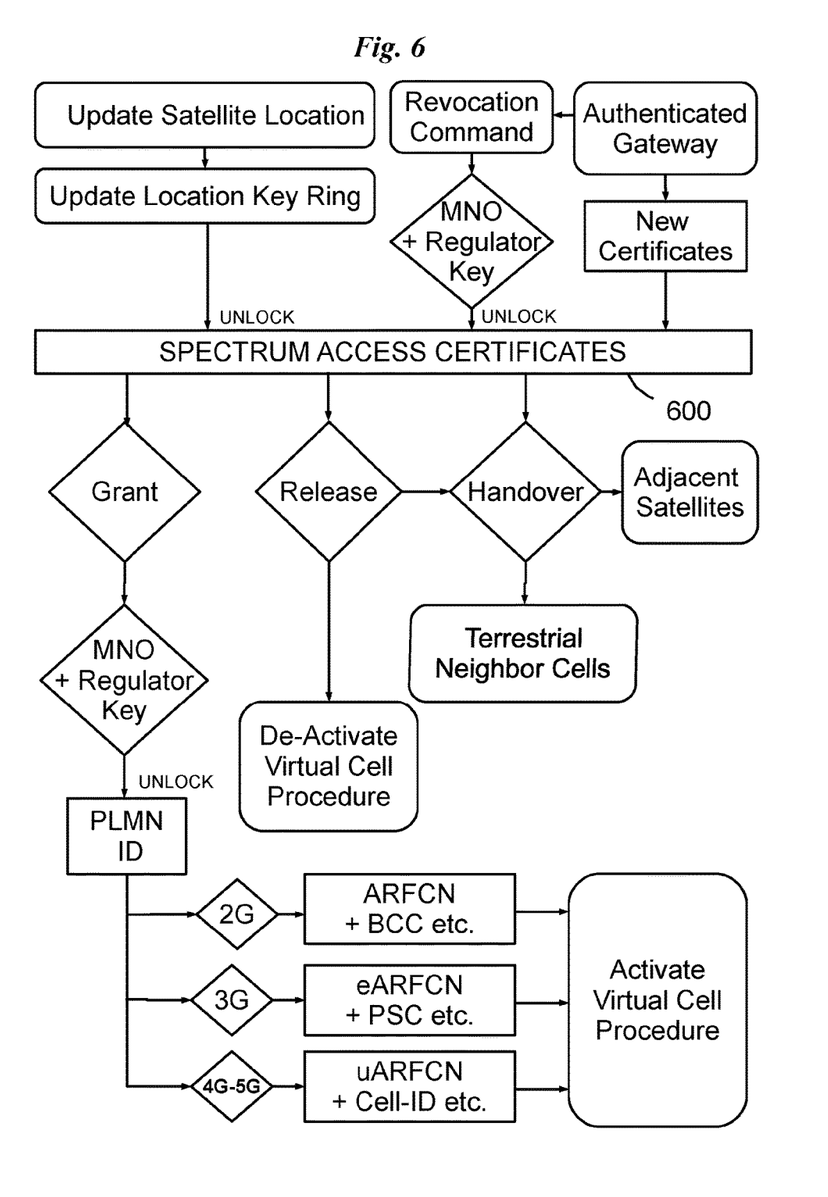
FIG. 6 Flow chart illustrating application of digitally signed and encrypted spectrum access certificates for authorization, authentication and activation of mobile satellite communication system Virtual Cells 107 attached to terrestrial mobile networks.

The spectrum access certificates (600) relevant to the current satellite position and valid or active Virtual Cells are decrypted on board the satellite and three-way authenticated by using the corresponding public keys in the satellite operators key ring at regular intervals determined by the beam update timer and satellite location. The decrypted certificate authorizes a satellite Virtual Cell (107) mobile service area using a MNO's licensed spectrum and mobile network and cell identification codes including the cell global identity (CGI) which comprises the Public Land Mobile Network (PLMN-ID) Mobile Network Code (MNC) plus Mobile Country Code (MCC) plus cell identity codes (700) (e.g. 4G EUTRAN eARFCN+Cell-ID, 3G UTRAN UMTS uARFCN+primary scrambling code, 2G GERAN ARFCN+BCC). The Absolute Radio Frequency Channel Number (ARFCN) values identify the authorized operating frequencies assigned to a Virtual Cell (107). For interworking with multiple radio networks and standards such as between 2G, 3G, 4G or 5G networks additional identification parameters are decoded from the access certificate (600). For example, such parameters include Location Area (LA), Routing Area Code (RAC) and Tracking Area Code (TAC).

The invention claimed is:

1. A communication system, comprising:
a standard compliant mobile user equipment;
a low earth orbit satellite configured to directly communicate with the standard compliant mobile user equipment;
a gateway configured to connect the satellite to a terrestrial mobile network operator's operational systems software;
the satellite comprising:
a satellite antenna array connected to a digital beamformer;
a satellite beam steering controller configured to allocate and or duplicate the mobile network's frequencies, cell identification, synchronisation signals and control channels to contiguous and or non-contiguous satellite beams or "virtual cells" steered to the mobile user equipment; and
the satellite beam steering controller configured to periodically update a mobile resource scheduler,
wherein the digital beamformer is configured to sub-divide the virtual cells into "Doppler Cells" wherein the downlink is jointly pre-compensated to reduce a residual Doppler shift to a range the standard mobile user equipment can correct.

2. The system according to claim 1, wherein the digital beamformer is configured to sub-divide the satellite beams into "Doppler Cells" whereby a worst case uplink timing difference is less than a maximum that is communicated to the standard mobile user equipment in one timing advance message.

3. The system of claim 1, wherein the satellite beam steering controller is configured to periodically update the mobile resource scheduler to align uplink transmissions from the standard mobile user equipment in a Doppler cell according to a time varying timing advance message determined by a distance between the mobile user equipment and the center of the Doppler cell.

4. The system of claim 1, wherein the satellite beam steering controller is configured to a set of transmit and receive frequencies by the terrestrial mobile network operator using a digitally signed and encrypted spectrum access certificate.

5. The system of claim 1, wherein the digital beamformer is a space-time adaptive beamformer.

6. The system of claim 1, wherein the digital beamformer is a frequency domain beamformer.

7. The system of claim 1, wherein the digital beamformer is configured to increase the capacity of a rank deficient satellite channel by allocating a mobile downlink transmission to a pair of virtual cells orthogonally polarized and overlapped in frequency and coverage area to achieve 2×2 MIMO capacity.

8. The system of claim 1, wherein the digital beamformer is configured to use measured uplink Doppler shift to resolve interfering mobile user equipment communications with sub-beamwidth resolution and accuracy by refining and adapting a beamforming weight vector.

9. The system of claim 1, wherein the digital beamformer is configured to group mobile user equipment according to Doppler shift, frequency, relative velocity and geographic location into "Doppler Cells" for cell resource allocation purposes.

10. The system of claim 4, wherein the spectrum access certificate upon authentication and decryption configures location dependent satellite beam steering parameters co-signed and encrypted by a mobile satellite communication system operator using a satellite location dependent private key ring.

11. The system of claim 1, wherein the terrestrial mobile network operator is configured to share spectrum resources that are duplicated to the satellite and extend the terrestrial mobile network capacity and coverage using the Virtual Cells allocated to satellite transmit and receive beams.

12. The system of claim 1, wherein the resource scheduler configures timing alignment of frequency domain resource blocks in the same virtual cell with reference to a reduced difference in path delay between UEs within a Virtual Cell.

13. The system of claim 1 wherein the capacity and coverage of the terrestrial mobile network is multiplied by duplicating cell-ID's, cell synchronisation signals and control channels to multiple Virtual Cells in a manner transparent to the mobile user equipment.

14. The system of claim 1, whereby duplicating cell-ID's, cell synchronisation signals and control channels to multiple Virtual cells permits seamless handover between the satellite and the terrestrial mobile network in a manner transparent to the mobile user equipment.

* * * * *